(12) United States Patent
Centurion

(10) Patent No.: US 11,328,021 B2
(45) Date of Patent: May 10, 2022

(54) AUTOMATIC RESOURCE MANAGEMENT FOR BUILD SYSTEMS

(71) Applicant: Microsoft Technology Licensing, LLC, Redmond, WA (US)

(72) Inventor: Matthew E. Centurion, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 16/237,173

(22) Filed: Dec. 31, 2018

(65) Prior Publication Data
US 2020/0210488 A1 Jul. 2, 2020

(51) Int. Cl.
| | |
|---|---|
| G06F 16/30 | (2019.01) |
| G06F 16/903 | (2019.01) |
| G06F 16/93 | (2019.01) |
| G06F 8/70 | (2018.01) |
| G06F 9/50 | (2006.01) |

(52) U.S. Cl.
CPC .......... *G06F 16/90344* (2019.01); *G06F 8/70* (2013.01); *G06F 9/5005* (2013.01); *G06F 16/93* (2019.01)

(58) Field of Classification Search
CPC ............................. G06F 16/93; G06F 16/90344
USPC ........ 707/609, 687, 705, 769, 790, 813, 821
See application file for complete search history.

(56) References Cited

U.S. PATENT DOCUMENTS

| | | | |
|---|---|---|---|
| 7,493,329 B2 * | 2/2009 | McMullen | G06Q 10/10 |
| 2003/0033594 A1 * | 2/2003 | Bowen | G06F 30/30 717/141 |
| 2005/0102253 A1 | 5/2005 | Wu et al. | |
| 2005/0246716 A1 * | 11/2005 | Smith | G06F 9/541 719/315 |
| 2005/0278718 A1 | 12/2005 | Griffith et al. | |
| 2007/0112849 A1 * | 5/2007 | McMullen | G06Q 10/10 |
| 2008/0177994 A1 * | 7/2008 | Mayer | G06F 9/4418 713/2 |
| 2015/0356123 A1 * | 12/2015 | Gorelik | G06F 16/213 715/765 |
| 2015/0378694 A1 * | 12/2015 | Lagergren | G06F 9/45516 717/143 |
| 2017/0123957 A1 * | 5/2017 | Gupta | G06F 11/3612 |
| 2018/0285470 A1 | 10/2018 | Liu et al. | |
| 2020/0210488 A1 * | 7/2020 | Centurion | G06F 8/54 |

OTHER PUBLICATIONS

"International Search Report and Written Opinion issued in PCT Application No. PCT/US2019/068217", dated Apr. 9, 2020, 11 Pages.

* cited by examiner

Primary Examiner — Sana A Al-Hashemi
(74) Attorney, Agent, or Firm — Schwegman Lundberg & Woessner, P.A.

(57) ABSTRACT

A method may include searching compiled code for a variable name of a resource, the variable name containing a predefined string; identifying a variable name in a resource manifest of the library that matches the variable name that contains the predefined string; based on the identifying, importing the resource to a location associated with the compiled code.

18 Claims, 5 Drawing Sheets

AUTOMATIC RESOURCE MANAGEMENT FOR BUILD SYSTEMS

BACKGROUND

Large codebases are often developed using a number of smaller components, such as static libraries. The libraries may then be linked into any application that requires them. Additionally, each library may have its own set of resource files (e.g., non-code files such as pictures, video, etc.). A developer must therefore remember that, after linking, to tell the Integrated Development Environment IDE or other development tools to also grab the resources for the library. Because the libraries may be many steps (different source trees, etc.) removed from the final application it is common that the IDE is not told to bring the resources in resulting in runtime errors—as opposed to build errors—that may not be perceived until a user runs the application. Additionally, as applications are iterated upon, it is common to not tell the remember that certain resources are no longer required, but are still being copied resulting in much large applications than needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
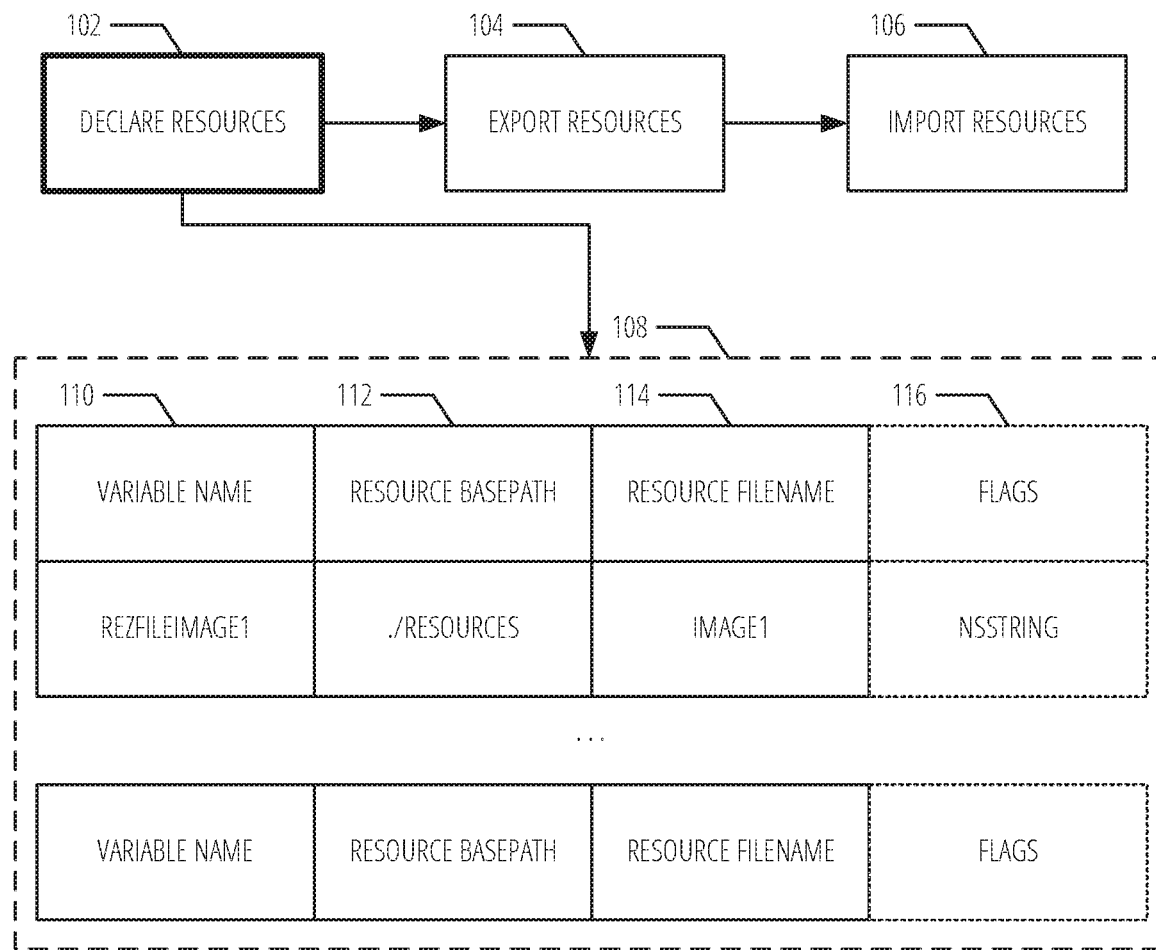
FIG. 1 is a process diagram illustrating operations to specify a set of resources, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

Summarizing the problem in the background, resources external to code are usually specified manually. Even if code that references resources ends up being removed by compiler/linker, the resources are still needlessly copied/included increasing size footprint of app. Manual clean-up of code or libraries being linked into the final app require a manual pass on resources to ensure they are no longer needed. Alternatively, if a resource is not linked, a run-time error will occur for the end-user.

Although many build system (e.g., XCODE® developer software by Apple, Inc. or VISUAL STUDIO® by Microsoft) have grown to allow more efficient & dynamic specification of code sources and components such as dynamic exports and Link File lists, resource management has mostly remained a static set of inputs needed to be manually updated for each project that consumes them. Furthermore, although development teams may prioritize code hygiene, compiler tools such as optimizers/dead-code strippers already help ensure a shipped product is free of unnecessary code. Resource files, however, do not have a similar breadth of tools and attention causing projects to keep shipping unnecessary resource files after code employing them has been removed either manually or automatically.

The different models for code/resource consumption used by products on desktop vs mobile (e.g., MACOS® vs IOS®) also pose a challenge for resource management. Code referenced by an ".app" on MACOS® based computing devices can live in ".framework" bundles which can also house needed resources. Yet, on iOS® based computing devices, development guidelines usually favor statically linking libraries into the ".app" causing some developers to create a resource-only ".bundle" analog to match the Mac framework. Although this may maintain a one-to-one correspondence with code/resources shared with Mac/iOS, it abstracts/hides the details. The results further perpetuates unnecessary resources via obscurity of obsolescence: either a resource is not required anymore, or a particular iOS .app does not use the code that requests it. For large codebases that may utilize hundreds of static libraries tracking which resource file need to be copied into which projects is a difficult task.

In summary, problems with existing build systems are four-fold: (1) lack of coupling/awareness of code sources and the resources it employs: (2) manual intervention needed at the project level when linking code requiring resources to a new/different target to ensure resource files also included: (3) code-divergence between platforms when requesting resource files due to differences in how a resource is packaged in an .app/.framework/.bundle: and (4) manual intervention/awareness needed to remove obsolete resource files if requesting code is removed. If code is removed automatically this would be difficult to observe efficiently.

In view of the above problems, a new process that improves on existing build solutions for resource management is described. The three basic operations may be (1) specification of resource files along with source code files (2) production/export of resource files at the same time as with the resource consuming binary target (e.g., application); and (3) consumption/import of resource files into the bundle (.app/.framework) of the target linking the code that employs the resource files. The second operation may be run at build time for a static library. The third operation may be run as part of the resource import phase after building the application, etc., that includes the static library.

As described in more detail herein, this process leverages the dead code stripping capabilities of existing project build tools to identify which resources remain in use by an application by looking in the binary for references to symbols for the resources. If a symbol is not found for a resource associated with a linked library, that resource need not be copied over for use in the application. Other benefits may be realized as discussed herein and as may be appreciated by one of ordinary skill in the art. The benefits of using such a process may allow for smaller final application sizes due to the reduced amount of resources included with the final application. The smaller size may be especially important in devices with limited storage space such as mobile phone— e.g., without the reduction in size, the final application may not be able to be installed in some instances. Similarly, the reduced number of resources may reduce system memory (e.g., RAM) because fewer resources may be loaded at runtime.

FIG. 1 is a process diagram illustrating operations to specify a set of resources, according to various examples. FIG. 1 includes operations 102, 104, 106, and resource declaration file 108. Resource declaration file 108 includes variable name field 110, resource basepath field 112, resource filename field 114, and flags field 116. Operation 102 may be for declaring resources, operation 104 may be for exporting resources, and operation 106 may be for importing resources. These three operations are described in greater detail in FIG. 1, FIG. 2, and FIG. 3, respectively. In various examples, resource declaration file 108 may be a file that identifies the resources that are made available by a static library. Although resource declaration file 108 is illustrated with a particular set of four ordered fields, more or fewer fields may be used without departing from the scope of this disclosure. Similarly, any standardized format may be used for storing the resource declarations such as JSON or XML.

Contents of an example resource declaration file 108 with three variable names (rezfileImage1, rezfileImage2, and rezfileStrings) may be REZFILES=\ rezfileImage1; ./resources; Image1 NSSTRING \ rezfileImage2; ./resources; Image2; NSSTRING \ rezfileStrings; ./resources; *.lproj/Localizable; NSSTRING In various examples, the value of variable name field 110 is the symbol (e.g. variable) to be used in code. Thus, it may be the name of a variable that will be generated as part of a project (e.g., library) as a separate source file. Each variable name in resource declaration file 108 may include a common string such as a common prefix, suffix, etc. This allows for easier searching in a binary at operation 106. For example, each variable may include a prefix of "rezfile." In various examples, an error may be presented if variable name does not include the common string. The value of the variable name field 110 for a resource may also be the last path component of resource filename field 114. The source code of the library may be modified to replace usages of the filename literal with this variable name.

In various examples, resource basepath field 112 may be the path to the directory (e.g., a location) containing the resource that is not to be replicated in a resource destination (e.g., the consuming project package). It may be relative to the "sources" file by starting with "." Or ".." or a full path such as in a build output folder. In various examples, it is possible to use environment variables in both <Resource Basepath> and <Resource Filename>.

In various examples, resource filename field 114 is the file name of resource, including any directories to create in destination bundle. Resource filename field 114 provides three functions. First, it provides the fullpath (when appended to <Resource Basepath>) to the resource to export. Second, it provides the path that is expected to be replicated in the consuming app/framework's bundle. Third, the last path component provides the string to assign to the Identifier/Variable Name chosen in the variable name field 110.

Some Resource-consuming APIs allows a filename with no extension to be requested. In various examples, the name of a file may be used in the same manner it is used with the APIs provided by such software. For example, some software provides for multiple versions of a graphic to be used based on the pixel density of a display or type of device. In such instances, a user often uses suffixes such as ~ipad or @2× for the variants of the graphic. Within resource filename field 114 there may be no need to declare each of these variants. Instead, all filenames matching the prefix identified in resource filename field 114 will be automatically included by searching resource basepath field 112 using a regular expression. For example, the regex used to find files related to specified name "foo" may be:

(foo)((~ipad|~iphone|[@_][1-9]x)?(\.[^.]*)?)

The default behavior for a resource based on variable name field 110, resource basepath field 112, and resource filename field 114 is to use the values of these fields to instantiate a "const char[ ]" variable with identifier/variable name. Additionally, the default is to obtain the last path component of the Resource Filename, pre-append the name of the target to produce the literal string <TargetName>_<OriginalFilename> and assign it to a variable. This process helps avoid collisions where two targets export a resource with the same filename.

The default behavior, however, may be altered by including a combination of the following flags in flags field 116.

| Type flags (Additional or fewer types can be used depending on the string types supported by the platform where employed). In some examples, only a single type flag is used for the resources. | |
|---|---|
| WCHAR | Use const wchar_t[ ] = L"..." instead of const char[ ] = "..." |
| CFSTRING | Use const CFStringRef = CFSTR("...") |
| NS STRING | Use NSString* const = @"..." |

| Other flags (can use multiple) | |
|---|---|
| NORENAME | Prevent resource filename from being renamed. This may be useful if there is another external dependency on this filename remaining what it is. Also useful when converting manually-managed resources to automatically-managed and help reduce initial impact/change. |
| NOSTRIP | Prevent dead-code stripper from optimizing symbol away using "__attribute__((used))" decorator. This may be useful if filename is not directly or easily referenced by code but should still be imported by any app/framework linking this target. |
| ATTACHED[?] | If the usage of this resource requires the inclusion of additional resources that cannot be or do not need to be referenced via their own symbols in code one can use this flag with the name of |

| | |
|---|---|
| | another variable within the brackets "[ ]" pointing to a list of triplets in the format: baseDir; fromPath; toPath<br>Such as:<br>    REZFILES = rezFileName; baseDir; resource1;<br>    ATTACHED[REZ1_LIST]<br>    REZ1_LIST =<br>        baseDir; folderFoo/resource2;<br>    folderFoo/resource2; \<br>        baseDir; folderFoo/resource3;<br>    folderBar/rezource3; \<br>Other implementations may be used such as JSON or XML without departing from the scope of this disclosure. The above example causes the system to import resource1 if it is referenced in final product, and if so also copy folderFoo/resource2 and folderFoo/resource3 (but rename this last one to "folderBar/rezource3").<br>Although similar can be achieved by specifying resource2 & resource3 as separate resources in REZFILES list with NOSTRIP flag, using ATTACHED reduces the amount of global variables declared, and in the example above their inclusion is hinged on the consumption of resource1, while using NOSTRIP would include them regardless.<br>Using ATTACHED flag also allows you to manually rename the files and paths to be different than their source. But unlike regularly specified resources, there may no prefix matching behavior, each folder or file needs may need to be specified individually. In other environments, there may be prefix matching, obviating the following.<br>Only one macro name may be provided within [ ], if multiple lists need to be joined, do so in the definition of the list items:<br>    REZ1_LIST = $(REZ_SOMEFILES)<br>    $(REZ_OTHERFILES) |
| TOKEN | This flag requires the use of ATTACHED flag and allows someone to specify a resource identifier that does not map to an actual resource on disk, but can still be used as a variable in the product to decide if the files specified in ATTACHED flag should be included in final product. |

Figure 2:
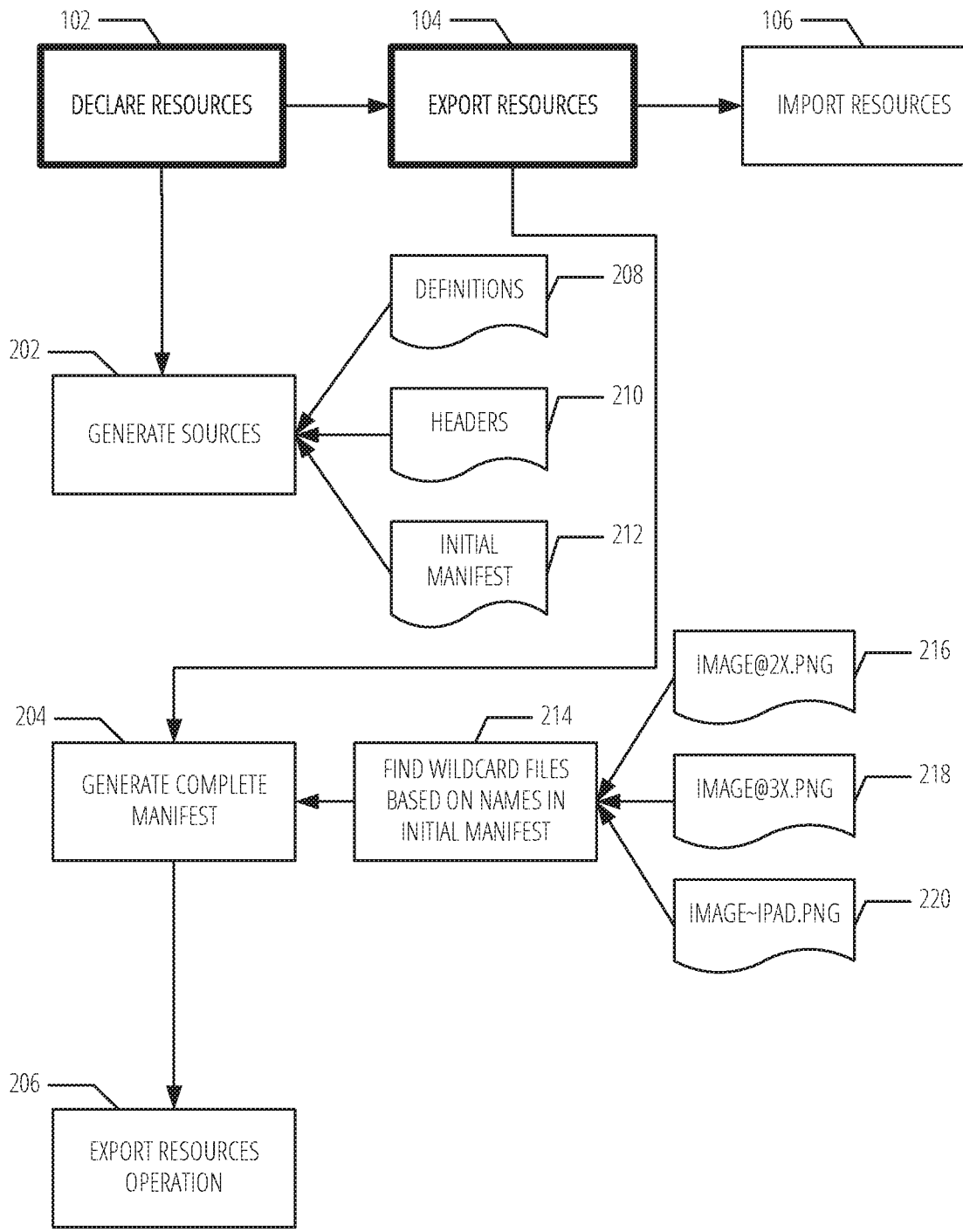
FIG. 2 is a process diagram illustrating operations for declaring and exporting resources, according to various examples.

FIG. 2 is a process diagram illustrating operations for declaring and exporting resources, according to various examples. FIG. 2 includes operations 102, 104, 106 as in FIG. 1. FIG. 2 further includes operations 202, 204, 214, definitions 208, headers 210, initial manifest 212, and files 216, 218, 220. The operations that make up importing and exporting resources may be performed using a set of automated scripts that are executed when the library is built. The result of the export operations may be a resource manifest file that catalogs what resources are available in the library, header and definition files for the resources, and a common location from which to import the resources from.

For example, at operation 202, three files may be generated in a location such as "$PROJECT_DIR/sre<targetName>/<platformSuffix>". The first may be a definition file such as "StaticLibResources_generated.cpp" (or .mm if NSString is requested) that includes definitions 208 for each of the resources. The resources may be defined as variable=literal definitions for each of the resources (e.g., const char[ ]=" . . . ") which may use a predefined common string (e.g., rezfile). A header file such as StaticLibResources_generated.h" header containing extern declarations of variables (e.g., headers 210) may be generated as well. Finally, initial manifest 212 may be generated that includes a list of resources from operation 102 that may be made available. Initial manifest 212 may be a file such as "StaticLibResources.json" file with json-encoded data for resources requested to be made available by the library.

At operation 204, a complete manifest file may be generated based on initial manifest 212. The complete manifest may also be a JSON-encoded file that is a complete catalog of the resources that made available by the library. For example, initial manifest 212 may only include the non-expanded (e.g., without regex permutations) versions of a resource. Thus, at operation 214, a script may navigate to the to the location of each resource and search for files that match the regex version of the filename and include any found files in the complete manifest. In some examples, the complete manifest may be considered the resource manifest for a library.

Three additional files may be generated at build time for the library. The first may be " . . . _inputfiles.xcfilelist" for resource files found. The second may be " . . . _outputfiles.xcfilelist" which includes the renamed (if needed) form of files to be processed/copied. The third may be the complete manifest which includes all the data from initial manifest 212 but expanded to include all the files from the second file (e.g., files 216, 218, 220). Finally, at the end of the script, a symlink to the complete manifest file may be created with same way name under, for examples, "$CONFIG_BUILD_DIR/StaticLibResources/<PlatformSuffix>" in order to make finding all the manifests easier.

At export resources operation 206, in various examples, another script (or as part of the first script) may run to export the identified resources. This script may, using the three files above as input files, export the resources into a common location for import by other projects. Exporting may include additional processing such as uncompressing or converting file formats. For example, a plist string may be converted to a binary string during the export stage. In some examples, the processing may be performed at the import stage, but if it is done during export it may only need to be performed once—saving computing resources.

Figure 3:
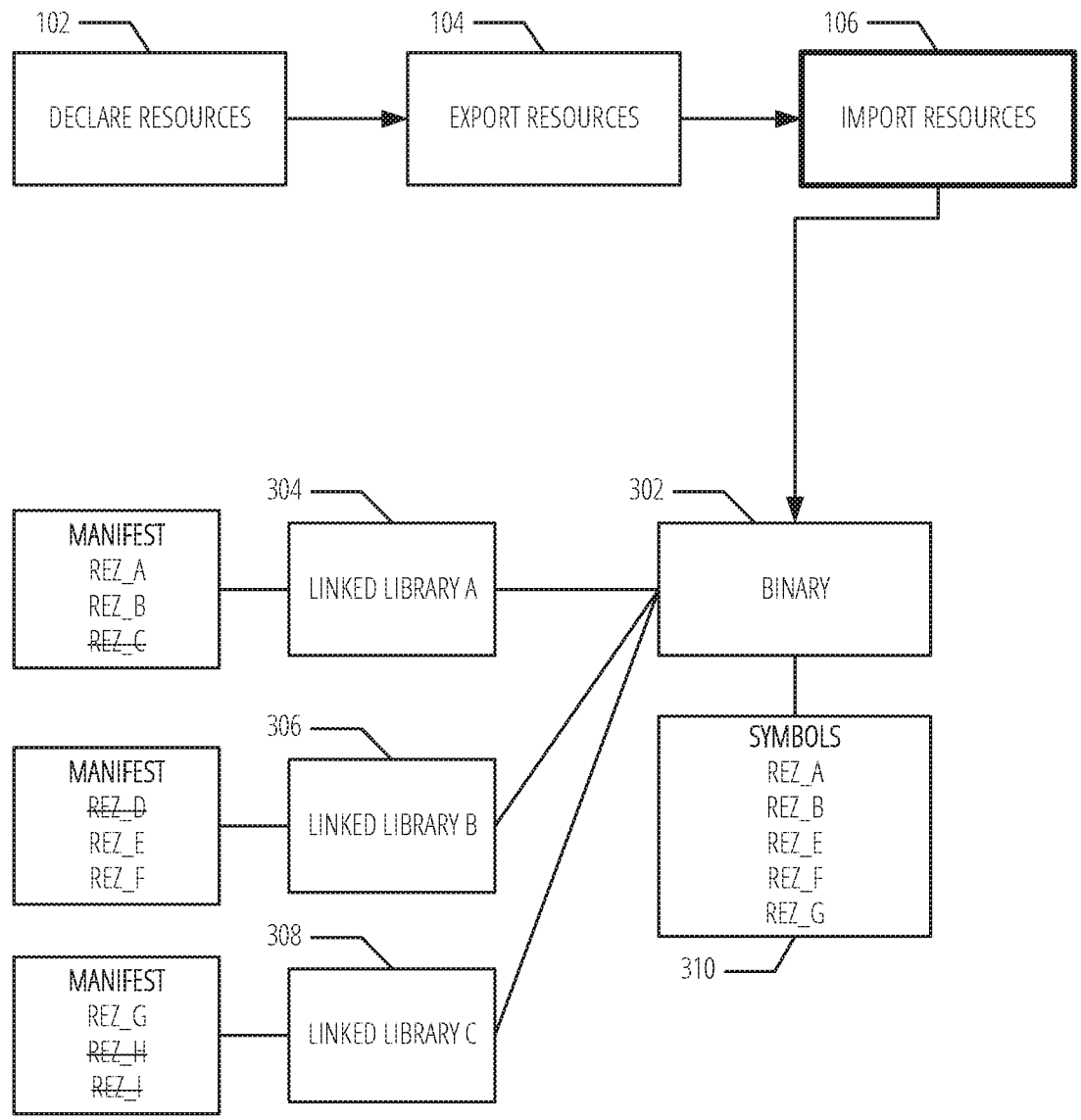
FIG. 3 is a schematic diagram illustrating symbols in a binary, according to various examples.

FIG. 3 is a schematic diagram illustrating symbols in a binary, according to various examples. FIG. 3 includes binary 302, libraries 304, 306, 308, and symbols 310. The diagram is a visualization of a scripted process that may be used to determine which resources to copy into to a project (e.g., application, framework, bundle). This process stands in contrast to the traditional copying that may be performed at build time in which all resources for any linked libraries are copied to the project.

The script may be run after the project has been compiled into a binary (e.g., binary 302). In some examples the script has no inputs. The process may include three operations. First, the binary may be examined using tools as known in the art (e.g., nm) to obtain a list of all symbols that contain the common string, which may be predefined, used to identify resources at operation 102. For example, FIG. 3 shows six symbols in binary 302.

Because of dead-stripping, any resources from a linked library that were not used in the project will no longer appear in binary 302 even though they were in source filed for the library. For example, REZ_C is in library 304 which binary 302 links to, but REZ_C is not present in symbols 310. Thus, the previously completed dead stripping process is leveraged to keep track of the resources that a project does not reference. It is also possible that symbol may be missing from binary 302 because a library was not linked at all and therefore would not be included in binary 302.

Next, each complete manifest file that was generated by operation 104 may be read by iterating over—e.g. by following the generated symlinks in "$CONFIG_BUILD_DIR/StaticLibResources/PLATFORM_SUFFIX". A complete list of possible resources may be generated by iterating through the manifest files. Then, symbols found in binary 302 may be matched to resource files found during the iterating. For each match, the resource may be copied to a directory for the project so that it is available during runtime.

As a preventive step, identifiers may be checked for duplicates across the iterated resource manifests. An error message may be shown to a user that lists the duplicates. Accordingly, a user may rename any identifiers of any identified libraries that include the duplicates to prevent linking errors that may arise in the future. The linking error may occur because the identifiers become global variable names and duplicates compiled into the same target will encounter a duplicate symbol error. If global variables are not used, the duplicate symbol error may not occur and thus the duplicate checking becomes even more important. It is also a good idea to check for duplicate files being imported. It is possible for two libraries to specify differently-named identifiers that map to a file resource of the same name (e.g., due to usage of NORENAME flag).

In another example, a record may be kept of how many times a resource is mapped to a symbol. If, after a threshold amount of time (e.g., six-months), no projects have referenced a resource a message may displayed indicating the last time there was a match. Therefore, unused resources may be removed from the static libraries without fearing current project would be affected.

Variations of the operations in FIGS. 1-3 may also be used if the build system itself manages the resource management. For example, the build system may keep track of resources that are made available in a library. Then, when a project is built that links to the library, the build system may only copy over resources from the library that are used in the project. As discussed previously, current build systems do not include such a feature and simply copy over all resources currently specified.

Figure 4:
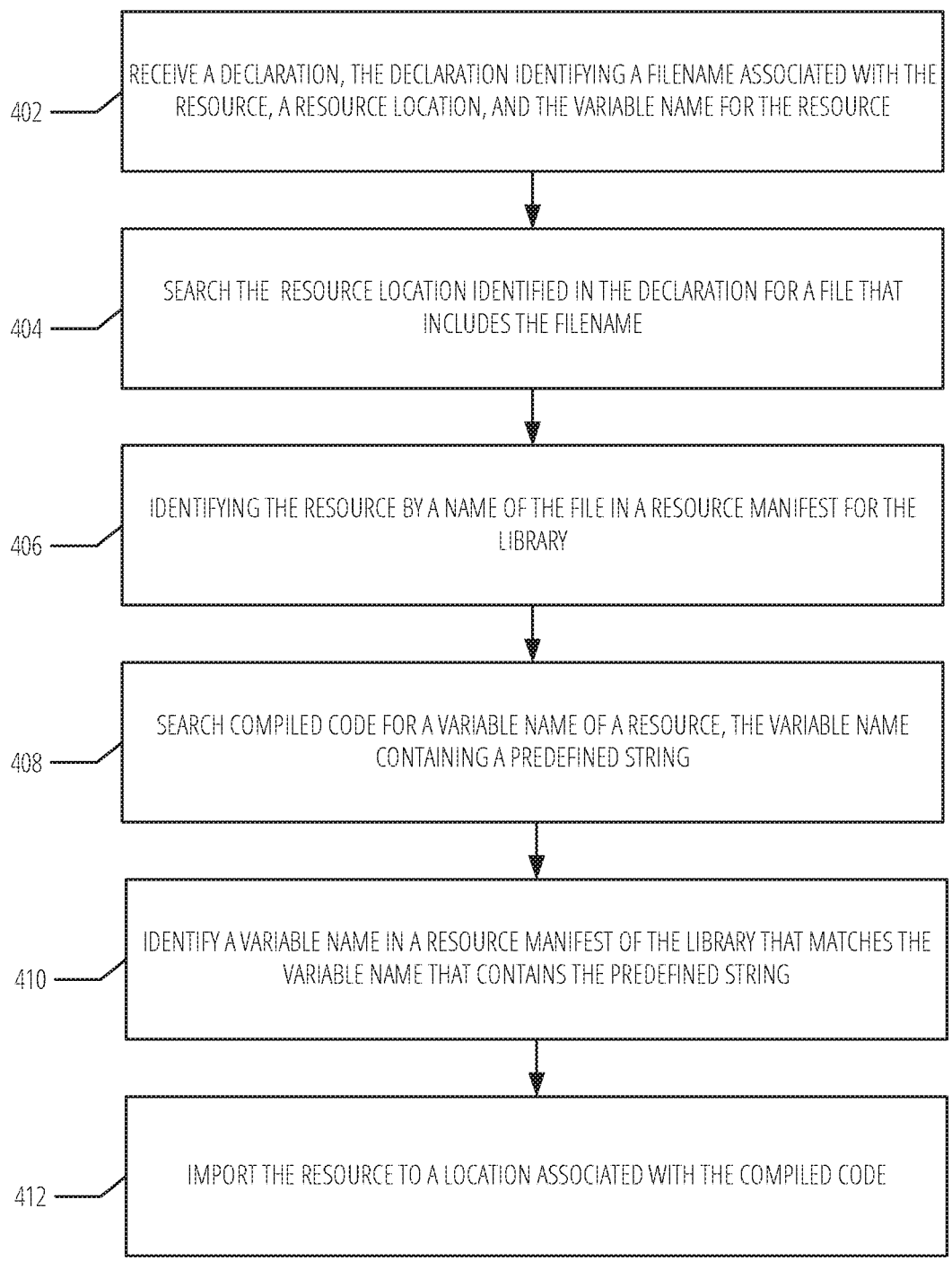
FIG. 4 is a flowchart illustrating a method to import resources, according to various examples.

FIG. 4 is a flowchart illustrating a method to import resources, according to various examples. The method is represented as a set of blocks that describe operations 402-412 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

Operation 402, in various examples, includes receiving a declaration. The declaration may be a file such as resource declaration file 108. The declaration may identify a resource (or more than one resource) to be included with a static library when linked into a package (e.g., a compiled set of code such as an application). Each respective resource in the declaration may be identified by a variable name that includes a predefined string, a filename associated with the resource, and a resource location of the resource. The declaration file may include a second filename associated with a second resource and a second variable name for the second resource, the second variable name including a predefined string. In various examples, each resource in the declaration of resources has the predefined string in its respective variable name. For example, a common prefix may be used.

Operation 404, in various examples, includes searching the resource location (e.g., a directory) identified in the declaration file for a file that includes the identified filename. Operation 404 may be repeated for each of the filenames and respective resource locations associated with the filenames. Searching may include performing a RegEx-matched (e.g., wildcard) search using the filename as a prefix in the resource location identified in the declaration file. The result of the search may be one or more files. For example, multiple variants of a resource may be stored in the resource location identified for the resource.

Operation 406, in various examples, includes identifying the resource by the name of the file in a resource manifest. The resource manifest may include the variable name of the resource as well. In some examples, the resource manifest is a repackaged (e.g., reformatted into a JSON format) version of the declaration. In other examples, the resource manifest may include additional files that may have been copied as detailed previously in operation 204 with respect to FIG. 2. In various examples, the resource manifest includes the names of each of the files found as a result of the RegEx-matched search discussed previously.

In various examples, the operations of the method may include generating header and definition files for each respective variable name in the declaration of resources. The definitions may be a const char[ ]" variable with the identifier/variable name in various examples.

In various examples, the operations may further include exporting the resource from the resource location identified in the declaration to a common location. As detailed previously, exporting may include converting or uncompressing a file from the resource location identified in the declaration. The exporting process may be performed for each resource in the declaration with all the resulting files being exported to the common location.

Operation 408 includes, in various examples, searching compiled code (e.g., a binary) for a variable name of a resource that contains the predefined string of operation 402. The compiled code may have been statically linked to the library associated with the resource manifest. In various examples, the compiled code may have been linked to more than one library. Searching may include using a tool that outputs the variable names (e.g., symbols) used in the compiled code after code-stripping has been performed.

Operation 410 includes, in various examples, identifying a variable name in a resource manifest of the library that matches the variable name that contains the predefined string. The resource manifest may be the manifest of operation 406. In various examples, the resource manifest for each linked library is iterated through to identify variable names of resource. Each of the variable names include the predefined string. The result may be a complete list of available resources in each of the linked libraries. The list may include more resources than have been identified by searching the compiled code for the predefined string.

Operation 412 includes, in various examples, includes based on the identifying in operation 410, importing the resource to a location associated with the compiled code. Importing may include copying the resource from the common location of the exported resources for the library into the location associated with the compiled code for use by the compiled code at runtime. For example, the resources may be copied to a package of an application if the compiled code is an application.

The method may further an operation of searching the compiled code for a second variable name that contains the predefined string. The operations may include triggering an error message when the second variable name in the compiled code does not match other variable names identified in the resource manifest. This may occur because, during the export phase, the referenced resource was unable to be found and thus the resulting final compiled code includes a variable name with no corresponding resource. The error may also be produced at the import phrase. The error may be presented to a user on a display device of the user.

EXAMPLE COMPUTER SYSTEM

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
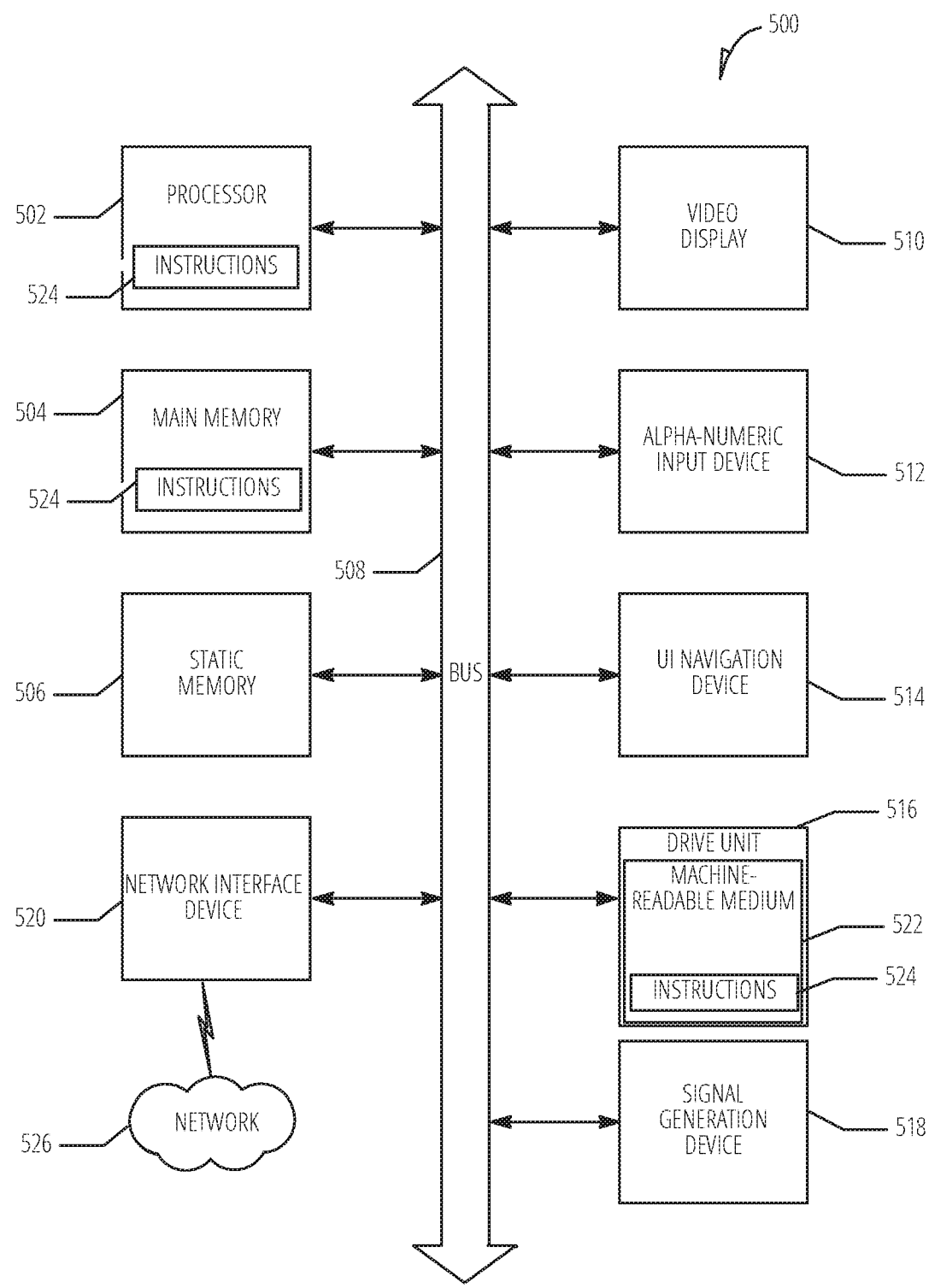
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system comprising:
   at least one processor; and
   a storage device comprising computer-readable instructions, which when executed by the at least one processor, configure the at least one processor to perform operations comprising:
   searching compiled code for a variable name of a resource from a resource manifest, the variable name comprising a file name variation of another variable name in the resource manifest, the variable name and the other variable name each containing a predefined string;
   identifying a variable name in the resource manifest of a library that matches the variable name comprising a file name variation of another variable name that contains the predefined string;
   generating a complete manifest, the complete manifest comprising the resource manifest and other resources based on the identified variable name;
   based on the identifying, importing a subset of the resources from the complete manifest to a location associated with the compiled code, the subset comprising only resources that are referenced by an application of the compiled code, and that are included in a source file of a linked library of the compiled code;
   searching the compiled code for a second variable name that contains the predefined string;
   detecting that the second variable name in the compiled code does not match other variable names identified in the resource manifest; and
   in response to the detecting, triggering an error message that indicates that the second variable name in the compiled code does not match other variable names identified in the resource manifest.

2. A method comprising:
   searching compiled code for a variable name of a resource from a resource manifest, the variable name comprising a file name variation of another variable name in the resource manifest, the variable name and the other variable name each containing a predefined string;
   identifying a variable name in the resource manifest of a library that matches the variable name comprising a file name variation of another variable name that contains the predefined string;
   generating a complete manifest, the complete manifest comprising the resource manifest and other resources based on the identified variable name;
   based on the identifying, importing a subset of the resources from the complete manifest to a location associated with the compiled code, the subset comprising only resources that are referenced by an application of the compiled code, and that are included in a source file of a linked library of the compiled code;
   searching the compiled code for a second variable name that contains the predefined string;
   detecting that the second variable name in the compiled code does not match other variable names identified in the resource manifest and
   in response to the detecting, triggering an error message that indicates that the second variable name in the compiled code does not match other variable names identified in the resource manifest.

3. A storage device comprising computer-readable instructions, which when executed by at least one processor, configure the at least one processor to perform operations comprising:
   searching compiled code for a variable name of a resource from a resource manifest, the variable name comprising a file name variation of another variable name in the resource manifest, the variable name and the other variable name each containing a predefined string;
   identifying a variable name in the resource manifest of a library that matches the variable name comprising a file name variation of another variable name that contains the predefined string;
   generating a complete manifest, the complete manifest comprising the resource manifest and other resources based on the identified variable name; and
   based on the identifying, importing a subset of the resources from the complete manifest to a location associated with the compiled code, the subset comprising only resources that are referenced by an application of the compiled code, and that are included in a source file of a linked library of the compiled code;
   searching the compiled code for a second variable name that contains the predefined string;
   detecting that the second variable name in the compiled code does not match other variable names identified in the resource manifest; and
   in response to the detecting, triggering an error message that indicates that the second variable name in the compiled code does not match other variable names identified in the resource manifest.

4. The system of claim 1, wherein the operations further include:
   receiving a declaration, the declaration identifying a filename associated with the resource, a resource location, and the variable name for the resource; and
   searching the resource location identified in the declaration for a file that includes the filename; and
   identifying the resource by a name of the file in the resource manifest.

5. The method of claim 2, further comprising:
   receiving a declaration, the declaration identifying a filename associated with the resource, a resource location, and the variable name for the resource; and
   searching the resource location identified in the declaration for a file that includes the filename; and
   identifying the resource by a name of the file in the resource manifest.

6. The storage device of claim 3, wherein the operations further include:
   receiving a declaration, the declaration identifying a filename associated with the resource, a resource location, and the variable name for the resource; and
   searching the resource location identified in the declaration for a file that includes the filename; and
   identifying the resource by a name of the file in the resource manifest.

7. The system of claim 4, wherein the declaration includes a second filename associated with a second resource and a second variable name for the second resource, the second variable name including the predefined string.

8. The system of claim 4, wherein the operations further include:
   generating a header file and a definition file based on the variable name in the declaration.

9. The system of claim 4, wherein the operation of searching the resource location identified in the declaration file for a file that includes the filename includes:
   performing a RegEx-matched search using the filename as a prefix in the resource location identified in the declaration file.

10. The system of claim 4, the operations further including:
    exporting the resource from the resource location identified in the declaration to a second location.

11. The method of claim 5, wherein the declaration includes a second filename associated with a second resource and a second variable name for the second resource, the second variable name including the predefined string.

12. The method of claim 5, wherein the operations further include:
    generating a header file and a definition file based on the variable name in the declaration.

13. The method of claim 5, wherein the operation of searching the resource location identified in the declaration file for a file that includes the filename includes:
    performing a RegEx-matched search using the filename as a prefix in the resource location identified in the declaration file.

14. The method of claim 5, the operations further including:
    exporting the resource from the resource location identified in the declaration to a second location.

15. The system of claim 9, wherein results of the RegEx search identify multiple files and wherein each of the multiple files is identified in the resource manifest by respective names of the multiple files.

16. The system of claim 10, wherein the operation of importing the resource to a location associated with the compiled code includes:
    copying the resource from the second location into the location associated with the compiled code.

17. The method of claim 13, wherein results of the RegEx-matched search identify multiple files and wherein each of the multiple files is identified in the resource manifest by respective names of the multiple files.

18. The method of claim 14, wherein the operation of importing the resource to a location associated with the compiled code includes:
    copying the resource from the second location into the location associated with the compiled code.

* * * * *